(12) United States Patent
Lin

(10) Patent No.: US 9,704,212 B2
(45) Date of Patent: Jul. 11, 2017

(54) SYSTEM AND METHOD FOR IMAGE PROCESSING

(71) Applicant: NVIDIA Corporation, Santa Clara, CA (US)

(72) Inventor: Maojiang (Jacen) Lin, Shenzhen (CN)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 14/175,925

(22) Filed: Feb. 7, 2014

(65) Prior Publication Data

US 2014/0218376 A1 Aug. 7, 2014

(30) Foreign Application Priority Data

Feb. 7, 2013 (CN) .......................... 2013 1 0049390

(51) Int. Cl.
*G06F 15/80* (2006.01)
*G06T 1/20* (2006.01)
*G06F 9/50* (2006.01)

(52) U.S. Cl.
CPC .............. *G06T 1/20* (2013.01); *G06F 9/5061* (2013.01); *G06F 2209/509* (2013.01)

(58) Field of Classification Search
CPC . G06T 15/005; G06T 2210/52; G06F 3/1438; G06F 3/1454; G06F 3/1462;
(Continued)

(56) References Cited

U.S. PATENT DOCUMENTS 5,251,295 A 10/1993 Ikenoue et al.

5,485,559 A 1/1996 Sakaibara et al.
(Continued)

FOREIGN PATENT DOCUMENTS

CN 101261729 A 9/2008
CN 101282478 10/2008
(Continued)

OTHER PUBLICATIONS

Molnar et al., A Sorting Classification of Parallel Rendering, Jul. 1994, IEEE Computer Graphics and Applications, vol. 14(4): 23-32, doi: 10.1109/38.291528.

(Continued)

*Primary Examiner* — Hau Nguyen

(57) ABSTRACT

A system and method for image processing are provided. The system comprises a main computing device and a secondary computing device. The main computing device comprises a main graphics card and a main central processing unit, and the secondary computing device comprises a secondary graphics card and a secondary central processing unit. The main computing device is configured to detect the secondary computing device. The main central processing unit is configured to send a request to process raw image data together to the secondary central processing unit and allocate the raw image data to the main graphics card and the secondary graphics card after receiving a response from the secondary central processing unit. The main graphics card and the secondary graphics card are configured to process images based on the allocation of the main central processing unit. The system and method for image processing provided by the present invention can take full advantage of graphics cards located in different computing devices and enable these graphics cards to work together to accelerate image processing.

20 Claims, 2 Drawing Sheets

(58) Field of Classification Search
CPC .. G06F 9/505; G06F 2209/509; G06F 3/0227; G06F 9/5083; G09G 2360/06; G09G 2300/026; G09G 2352/00; H04W 92/16
See application file for complete search history.

(56) References Cited

U.S. PATENT DOCUMENTS

| | | | |
|---|---|---|---|
| 5,781,747 A | 7/1998 | Smith et al. | |
| 5,794,016 A | 8/1998 | Kelleher | |
| 5,956,046 A | 9/1999 | Kehlet et al. | |
| 6,044,215 A | 3/2000 | Charles et al. | |
| 6,141,021 A | 10/2000 | Bickford et al. | |
| 6,191,800 B1 | 2/2001 | Arenburg et al. | |
| 6,192,388 B1 * | 2/2001 | Cajolet | G06F 9/5072 718/100 |
| 6,206,087 B1 | 3/2001 | Nakase et al. | |
| 6,282,596 B1 | 8/2001 | Bealkowski et al. | |
| 6,304,952 B1 | 10/2001 | Suzuoki | |
| 6,359,624 B1 | 3/2002 | Kunimatsu | |
| 6,397,343 B1 | 5/2002 | Williams et al. | |
| 6,473,086 B1 | 10/2002 | Morein et al. | |
| 6,476,816 B1 | 11/2002 | Deming et al. | |
| 6,535,216 B1 | 3/2003 | Deming et al. | |
| 6,630,936 B1 | 10/2003 | Langendorf | |
| 6,631,474 B1 | 10/2003 | Cai et al. | |
| 6,654,826 B1 | 11/2003 | Cho et al. | |
| 6,670,958 B1 | 12/2003 | Aleksic et al. | |
| 6,711,691 B1 | 3/2004 | Howard et al. | |
| 6,772,265 B2 | 8/2004 | Baweja et al. | |
| 6,832,269 B2 | 12/2004 | Huang et al. | |
| 6,835,070 B1 | 12/2004 | Law | |
| 6,864,891 B2 | 3/2005 | Myers | |
| 6,914,779 B2 | 7/2005 | Askeland et al. | |
| 6,919,894 B2 | 7/2005 | Emmot et al. | |
| 6,956,579 B1 | 10/2005 | Diard et al. | |
| 6,985,152 B2 | 1/2006 | Rubinstein et al. | |
| 7,019,752 B1 | 3/2006 | Paquette et al. | |
| 7,024,510 B2 | 4/2006 | Olarig | |
| 7,058,829 B2 | 6/2006 | Hamilton | |
| 7,075,541 B2 | 7/2006 | Diard | |
| 7,079,149 B2 | 7/2006 | Main et al. | |
| 7,080,181 B2 | 7/2006 | Wolford | |
| 7,119,808 B2 | 10/2006 | Gonzalez et al. | |
| 7,321,367 B2 | 1/2008 | Isakovic et al. | |
| 7,634,668 B2 | 12/2009 | White et al. | |
| 7,663,633 B1 | 2/2010 | Diamond et al. | |
| 7,995,003 B1 | 8/2011 | Diard et al. | |
| 9,075,559 B2 | 7/2015 | Wyatt et al. | |
| 9,087,161 B1 | 7/2015 | Diamond | |
| 9,135,675 B2 | 9/2015 | Wyatt et al. | |
| 2002/0073247 A1 | 6/2002 | Baweja et al. | |
| 2002/0141152 A1 | 10/2002 | Pokharna et al. | |
| 2002/0180725 A1 | 12/2002 | Simmonds et al. | |
| 2003/0067470 A1 | 4/2003 | Main et al. | |
| 2004/0008200 A1 | 1/2004 | Naegle et al. | |
| 2004/0032861 A1 | 2/2004 | Lee | |
| 2004/0039954 A1 | 2/2004 | White et al. | |
| 2004/0125111 A1 | 7/2004 | Tang-Petersen et al. | |
| 2004/0199696 A1 | 10/2004 | Chari et al. | |
| 2005/0012749 A1 | 1/2005 | Gonzalez et al. | |
| 2005/0017980 A1 | 1/2005 | Chang et al. | |
| 2005/0028015 A1 | 2/2005 | Asano et al. | |
| 2005/0041031 A1 | 2/2005 | Diard | |
| 2005/0088445 A1 | 4/2005 | Gonzalez et al. | |
| 2005/0190190 A1 | 9/2005 | Diard et al. | |
| 2005/0190536 A1 | 9/2005 | Anderson et al. | |
| 2005/0270298 A1 | 12/2005 | Thieret | |
| 2008/0084419 A1 * | 4/2008 | Bakalash | G06F 9/5044 345/505 |
| 2012/0084774 A1 | 4/2012 | Post et al. | |
| 2013/0050063 A1 * | 2/2013 | Poornachandran | H04L 63/20 345/2.1 |

FOREIGN PATENT DOCUMENTS

| | | |
|---|---|---|
| CN | 101354780 | 1/2009 |
| CN | 101576994 | 11/2009 |
| CN | 102436364 A | 5/2012 |
| TW | 477912 | 3/2002 |
| TW | 200809680 A | 2/2008 |
| TW | 200844843 A | 11/2008 |

OTHER PUBLICATIONS

"Heterogeneous Cloud Computing" (in "2011 IEEE International Conference on Cluster Computing", by Steve Crago, Kyle Dunn, Patrick Eads, Lorin Hochstein, Don-In Kang, Mikyung Kang, Devendra Modium, Karandeep Singh, Jinwoo Suh, Joh Paul Walters. DOI 10.1109/CLUSTER.2011.49).

"Intel Developer Forum to Spotlight PCI Express," by Sebastian Rupley. PC Magazine, dated Sep. 2002.

Bhatt, Ajay V., "Creating a PCI Interconnect", 2002.

U.S. Appl. No. 60/523,084 of Bakalash et al. (2008/0084419), Nov. 19, 2003.

* cited by examiner

SYSTEM AND METHOD FOR IMAGE PROCESSING

CROSS-REFERENCE TO RELATED APPLICATIONS

This application claims priority to Chinese Patent Application No. 201310049390.7, filed on Feb. 7, 2013, which is hereby incorporated by reference in its entirety.

FIELD OF INVENTION

Embodiments of the present invention relates generally to a field of image processing, in particular, to a system and method for image processing.

BACKGROUND

At present, many families have more than one computing device, such as a desktop computer, a notebook computer, a tablet computer, smart phone and so on. Each of these computing devices may have its own graphics card or subsystem. Usually, people use their computing devices at home to edit texts, receive and send e-mails, enjoy music and so on. But sometimes, there may be some special needs, for example, running video-processing software on the computing device. In that case, the graphics card of the computing device is expected to ramp up to deal with complex and heavy load image processing. Obviously, it is not economical and necessary to replace the graphics card with a more powerful one for this computing device for such a temporary need. And there may be other computing devices at home which are in idle states, which is a waste of resources.

SUMMARY OF THE INVENTION

Accordingly, there is a need for providing a system and method for image processing to address the problem described above.

In one embodiment, a system for image processing is disclosed. The system comprises a main computing device and one or more secondary computing devices. The main computing device comprises a main graphics card and a main central processing unit. Each of the one or more secondary computing devices comprises a secondary graphics card and a secondary central processing unit. The main computing device is configured to detect the one or more secondary computing devices. The main central processing unit is configured to send respective requests to process raw image data together to respective secondary central processing units of the one or more secondary computing devices after the main computing device detects the one or more secondary computing devices, and allocate the raw image data to the main graphics card and respective secondary graphics cards of the one or more secondary computing devices after receiving respective responses from the respective secondary central processing units of the one or more secondary computing devices. The respective secondary central processing units of the one or more secondary computing devices are configured to respond to the main central processing unit based on the respective requests. The main graphics card is configured to process the allocated partial image data of the raw image data, receive processed remaining image data of the raw image data, and combine the processed partial image data and the processed remaining image data. And the respective secondary graphics cards of the one or more secondary computing devices are configured to process the allocated remaining image data and send the processed remaining image data to the main graphics card.

In a preferred embodiment of the present invention, each of the main computing device and the one or more secondary computing devices further comprises a graphics card test module, which is configured to test performance of a corresponding main graphics card or a corresponding secondary graphics card. The respective secondary central processing units of the one or more secondary computing devices are further configured to send test results of the respective secondary graphics cards of the one or more secondary computing devices to the main central processing unit respectively. And the main central processing unit is further configured to allocate the raw image data based on a test result of the main graphics card and the test results of the respective secondary graphics cards of the one or more secondary computing devices.

Optionally, the main central processing unit is further configured to allocate the remaining image data to first (n+1) secondary graphics cards with better performance when receiving more than n responses, and wherein n is a positive integer.

In a preferred embodiment of the present invention, the performance is selected from a group including processor clock, memory size and memory bandwidth.

In a preferred embodiment of the present invention, the main central processing unit is further configured to proportionately allocate the raw image data to the main graphics card and the respective secondary graphics cards of the one or more secondary computing devices.

Optionally, the main central processing unit is further configured to allocate the remaining image data to the secondary graphics cards corresponding to (n+1) secondary central processing units, which respond to the main central processing unit earliest when receiving more than n responses, and wherein n is a positive integer.

In a preferred embodiment of the present invention, the main central processing unit is further configured to allocate the raw image data based on time order of frames of the raw image data or positions of macroblocks in a frame of the raw image data.

In a preferred embodiment of the present invention, the main computing device and the one or more secondary computing devices communicate with each other via one or more connecting lines.

In a preferred embodiment of the present invention, the main computing device and the one or more secondary computing devices further comprise respective wireless network cards and are configured to wirelessly communicate with each other via the respective wireless network cards.

In a preferred embodiment of the present invention, the main computing device and the one or more secondary computing devices further comprise respective Bluetooth modules and are configured to communicate with each other via the respective Bluetooth modules.

In a preferred embodiment of the present invention, the main graphics card and the respective secondary graphics cards of the one or more secondary computing devices are discrete graphics cards.

In another embodiment, a method for image processing is disclosed. The method comprises: detecting one or more secondary computing devices by a main computing device, wherein the main computing device comprises a main graphics card and a main central processing unit, and each of the one or more secondary computing devices comprises a secondary graphics card and a secondary central processing unit; sending respective requests to process raw image data together to respective secondary central processing units of the one or more secondary computing devices by the main central processing unit after the main computing device detects the one or more secondary computing devices; responding to the main central processing unit based on the respective requests by the respective secondary central processing units of the one or more secondary computing devices; receiving respective responses from the respective secondary central processing units of the one or more secondary computing devices and allocating the raw image data to the main graphics card and respective secondary graphics cards of the one or more secondary computing devices by the main central processing unit; processing the allocated partial image data of the raw image data by the main graphics card, and processing the allocated remaining image data of the raw image data by the respective secondary graphics cards of the one or more secondary computing devices; sending the processed remaining image data to the main graphics card by the respective secondary graphics cards of the one or more secondary computing devices; and receiving the processed remaining image data and combining the processed partial image data and the processed remaining image data by the main graphics card.

In a preferred embodiment of the present invention, the method further comprises: testing performance of the main graphics card and the respective secondary graphics cards of the one or more secondary computing devices by corresponding graphics card test modules, which are included in the main computing device and the one or more secondary computing devices respectively; and sending test results of the respective secondary graphics cards of the one or more secondary computing devices to the main central processing unit respectively by the respective secondary central processing units of the one or more secondary computing devices; wherein the allocating the raw image data comprises allocating the raw image data based on a test result of the main graphics card and the test results of the respective secondary graphics cards of the one or more secondary computing devices by the main central processing unit.

Optionally, the allocating the raw image data comprises allocating the remaining image data to first (n+1) secondary graphics cards with better performance when the main central processing unit receives more than n responses, and wherein n is a positive integer.

In a preferred embodiment of the present invention, the performance is selected from a group including processor clock, memory size and memory bandwidth.

In a preferred embodiment of the present invention, the allocating the raw image data comprises proportionately allocating the raw image data to the main graphics card and the respective secondary graphics cards of the one or more secondary computing devices.

Optionally, the allocating the raw image data comprises allocating the remaining image data to the secondary graphics cards corresponding to (n+1) secondary central processing units which respond to the main central processing unit earliest when the main central processing unit receives more than n responses, and wherein n is a positive integer.

In a preferred embodiment of the present invention, the allocating the raw image data is based on time order of frames of the raw image data or positions of macroblocks in a frame of the raw image data.

In a preferred embodiment of the present invention, the main computing device and the one or more secondary computing devices communicate with each other by one or more wired connections.

In a preferred embodiment of the present invention, the main computing device and the one or more secondary computing devices communicate with each other wirelessly.

The system and method for image processing provided by the present invention can take full advantage of graphics cards located in different computing devices and enable these graphics cards to work together to accelerate image processing.

Advantages and features of the present invention will be described in detail below in connection with the accompanying drawings.

BRIEF DESCRIPTION OF THE DRAWINGS

In order that the advantages of the invention will be readily understood, a more detailed description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, wherein.

DETAILED DESCRIPTION

In the following discussion, details are presented so as to provide a more thorough understanding of the present invention. However, the present invention may be implemented without one or more of these details as would be apparent to one of ordinary skill in the art. Certain examples are illustrated without elaborate discussion of technical features that would be within the purview of one of ordinary skill in the art so as to avoid confusion with the present invention.

Figure 1:
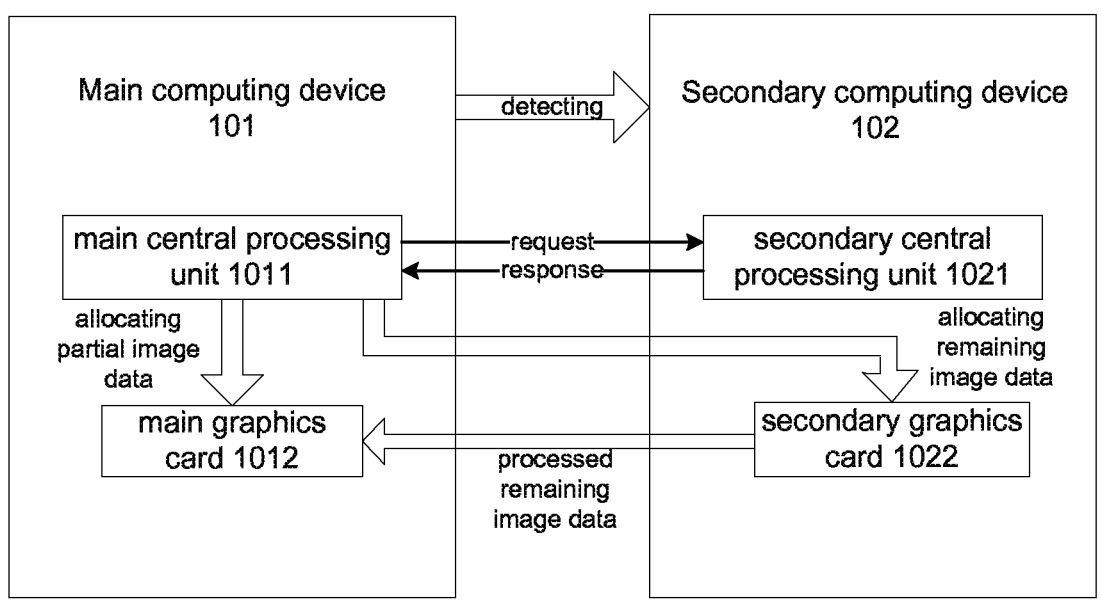
FIG. 1 illustrates a structure diagram of a system for image processing according to a preferred embodiment of the present invention.

According to one aspect of the present invention, a system for image processing is provided. FIG. 1 illustrates a structure diagram of a system 100 for image processing according to a preferred embodiment of the present invention. As shown in FIG. 1, the system 100 for image processing comprises a main computing device 101 and one or more secondary computing devices 102. For the purpose of making the description brief, only one secondary computing device is shown in FIG. 1. Those skilled in the art can understand that when there are multiple secondary computing devices 102, it may not be necessary that these secondary computing devices 102 are identical.

The main computing device 101 comprises a main graphics card 1012 or subsystem and a main central processing unit 1011, and each of the one or more secondary computing devices 102 comprises a secondary graphics card 1022 and a secondary central processing unit 1021. Each of the main computing device 101 and the secondary computing devices may be any computing device, such as a desktop computer, a notebook computer, a smart terminal and so on. The main computing device 101 is configured to detect the one or more secondary computing devices 102. The main central processing unit 1011 is configured to send respective requests to process raw image data together to respective secondary central processing units 1021 of the one or more secondary computing devices 102 after the main computing device 101 detects the one or more secondary computing devices 102, and allocate the raw image data to the main graphics card 1012 and respective secondary graphics cards 1022 of the one or more secondary computing devices 102 after receiving respective responses from the respective secondary central processing units 1021 of the one or more secondary computing devices 102.

The respective secondary central processing units 1021 of the one or more secondary computing devices 102 are configured to respond to the main central processing unit 1011 based on the respective requests. The main graphics card 1012 is configured to process the allocated partial image data of the raw image data, receive processed remaining image data of the raw image data, and combine the processed partial image data and the processed remaining image data. The respective secondary graphics cards 1022 of the one or more secondary computing devices 102 are configured to process the allocated remaining image data and send the processed remaining image data to the main graphics card 1012.

In the system 100 for image processing according to a preferred embodiment of the present invention, graphics cards located in different computing devices can advantageously be enabled to process images together. Image processing capabilities can be improved and image processing is accelerated relative to the case of using a graphic card in one computing device to process images. Furthermore, there is no need to replace the current graphics card with a more powerful one, which is more economical and effective.

Those skilled in the art can understand that the main computing device 101 communicates with the one or more secondary computing devices 102 more than once. The communication comprises detecting the one or more secondary computing devices 102 by the main computing device 101, communications between the main central processing unit 1011 and the respective secondary central processing units 1021 of the one or more secondary computing devices 102, allocating the remaining image data to the respective secondary graphics cards 1022 of the one or more secondary computing devices 102 by the main central processing unit 1011 and sending the processed remaining image data to the main graphics card 1012 by the respective secondary graphics cards 1022 of the one or more secondary computing devices 102.

According to a preferred embodiment of the present invention, the main computing device 101 and the one or more secondary computing devices 102 may be configured to communicate with each other via one or more connecting lines. The one or more connecting lines can ensure the speed and the quality of the communication. The connecting lines may be network cables, Universal Serial Buses (USBs) and so on. Preferably, the connecting lines may accord with the SuperSpeed USB standard (USB 3.0). Thus the connecting lines have high speed bandwidth interfaces, via which the data transmission rate between the main computing device 101 and the one or more secondary computing devices 102 can be up to 4.8 Gbps in one example.

According to another preferred embodiment of the present invention, the main computing device 101 and the one or more secondary computing devices 102 may further comprise respective wireless network cards (not shown in FIG. 1) and are configured to wirelessly communicate with each other via the respective wireless network cards.

According to yet another preferred embodiment of the present invention, the main computing device and 101 the one or more secondary computing devices 102 may further comprise respective Bluetooth modules (not shown in FIG. 1) and are configured to communicate with each other via the respective Bluetooth modules.

The communication between the main computing device 101 and the one or more secondary computing devices 102 via their wireless network cards or Bluetooth modules can reduce system cost and make the system well extendable and easy to be maintained. It should be noted that when the number of the secondary computing devices 102 is greater than one and all secondary computing devices 102 communicate with the main computing device 101, the main computing device 101 and the secondary computing devices 102 can form a star topology structure.

According to a preferred embodiment of the present invention, the main graphics card 1012 and the respective secondary graphics cards 1022 of the one or more secondary computing devices 102 may be discrete graphics cards. Compared with an integrated graphics card, a discrete graphic card has its separate memory and does not occupy the system memory. And in general, a discrete card is technologically superior and can provide better display effect and operating performance than an integrated graphics card. Furthermore, since two or more graphics cards which process images together are located in different computing devices, there is no need to specifically limit these graphics card in particular models or types like dual graphics cards located in the same computing device.

According to a preferred embodiment of the present invention, each of the main computing device 101 and the one or more secondary computing devices 102 may further comprise a graphics card test module (not shown in FIG. 1) respectively, which is configured to test performance of a corresponding main graphics card 1012 or a corresponding secondary graphics card 1022. The respective secondary central processing units 1021 of the one or more secondary computing devices 102 may be further configured to send test results of the respective secondary graphics cards 1022 of the one or more secondary computing devices 102 to the main central processing unit 1011. And the main central processing unit 1011 may be further configured to allocate the raw image data based on a test result of the main graphics card 1012 and the test results of the respective secondary graphics cards 1022 of the one or more secondary computing devices 102.

For example, when there is only one secondary computing device 102, performance of the main graphics card 1012 and the secondary graphics card 1022 can be tested by the respective graphics card test modules of the main computing device 101 and the secondary computing device 102. According to respective test results of the main graphics card 1012 and the secondary graphics card 1022, if the performance of the main graphics card is better, the main central processing unit 1011 allocates more image data to the main graphics card 1012 and allocates less image data to the secondary graphics card 1022, and vice versa. For example, after being tested, it is determined that the model of the main graphics card 1012 is GTX580, while the model of the secondary graphics card 1022 is GTX470. The performance of the main graphics card 1012 is better than that of the secondary graphics card, so the main central processing unit 1011 allocates more image data to the main graphics card 1012 and less image data to the secondary graphics card 1022. Preferably, the respective test results of the main graphics card 1012 and the secondary graphics card 1022 may be quantified to a specific number. Thus, the main central processing unit 1011 can accurately allocate the raw image data proportionally based on the performance of the main graphics card 1012 and the secondary graphics card 1022.

Preferably, the performance of a graphics card tested by a graphics card test module is selected from a group including processor clock, memory size and memory bandwidth. Processor clock is the operating frequency of a graphics processing unit integrated on the graphics card, which reflects the performance of the graphics processing unit in a way. Memory size is the memory capacity of a graphics card, which indicates the capability of the memory for storing data temporarily and affects the performance of the graphics card in a way. Memory bandwidth is the number of the bits transmitted by a memory of the graphics card in a clock cycle. The greater the number is, the more data can be transmitted in a cycle. In general, the larger the memory bandwidth, the better the performance of the graphics card. Therefore, processor clock, memory size and memory bandwidth can reflect performance of a graphics card.

In a preferred embodiment of the present invention, the graphics card test module may be configured to use the weighted sum of processor clock, memory size and memory bandwidth to quantify performance of a graphics card to a specific number as a basis for allocating raw image data. Those skilled in the art can understand that if there are two secondary computing devices 102, and after being tested, the test result ratio among the main graphics card 1012 and the two secondary graphics cards 102 is a1:a2:a3, wherein a1, a2 and a3 are all any real numbers, the main central processing unit 1011 allocates the raw image data to the main graphics card 1012 and the respective graphics cards 1022 of the two secondary computing devices 102 based on the proportion of a1:a2:a3.

The graphics cards located in different computing devices can be utilized effectively by allocating the raw image data based on the respective performance of the main graphics card and the secondary graphics card. Thus the total image processing speed can be accelerated and the quality of image processing can be improved. Those skilled in the art can understand that other performance parameters may also be adopted, such as the model of a graphics card.

Optionally, the main central processing unit 1011 may be further configured to allocate the remaining image data to first (n+1) secondary graphics cards with better performance when receiving more than n responses, wherein n is a positive integer. Those skilled in the art can determine the value of n based on the communication quality between the main computing device 101 and the secondary computing devices 102 and the total amount of the raw image data to be processed.

Preferably, n is equal to one, two or three. For example, n may be equal to two where the number of the secondary computing devices 102 is four. In this case the main central processing unit 1011 receives four responses, but after the respective graphics card test modules of the four secondary computing devices 102 test the corresponding graphics cards, the main central processing unit 1011 only chooses the first three secondary graphics cards with better performance to process images together with the main graphics card 1012. When there are too many secondary computing devices 102, there is a large amount of data transmitted between the main computing device 101 and the secondary computing devices 102, and the combining operation performed by the main graphics card 1012 is more complex. In order to avoid errors that may be brought from a large amount of data transmission, several secondary graphics cards 1022 with better performance are preferably chosen from all secondary computing devices 102 to operate together with the main graphics card 1012.

According to another preferred embodiment of the present invention, the main central processing unit 1011 may be further configured to proportionately allocate the raw image data to the main graphics card 1012 and the respective secondary graphics cards 1022 of the one or more secondary computing devices 102. No matter how many secondary computing devices 102 there are or how the respective performance of graphics cards of the main computing device 101 and the secondary computing devices 102 is, it can be efficient and fast to proportionately allocate the raw image data based on the number of graphics cards directly.

Optionally, the main central processing unit 1011 may be further configured to allocate the remaining image data to the secondary graphics cards 1022 corresponding to (n+1) secondary central processing units 1021 which respond to the main central processing unit 1011 earliest when receiving more than n responses, and wherein n is a positive integer. Those skilled in the art can determine the value of n based on the communication quality between the main computing device 101 and the secondary computing devices 102 and the total amount of the raw image data to be processed. Preferably, n is equal to one, two or three. As already mentioned above, when there are too many secondary computing devices 102, there is a large amount of data transmitted between the main computing device 101 and the secondary computing devices 102, and the combining operation performed by the main graphics card 1012 is more complex. The main central processing unit 1011 may choose several secondary graphics cards 1022 corresponding to the secondary central processing units 1021 which respond earliest to process images together with the main graphics card 1012 so as to avoid image processing errors.

According to another preferred embodiment of the present invention, the main central processing unit 1011 may be further configured to allocate the raw image data based on the time order of frames of the raw image data or positions of macroblocks in a frame of the raw image data. For example, when there is only one secondary computing device 102, the main central processing unit 1011 may allocate odd frames to the main graphics card 1012 and allocate even frames to the secondary graphics card 1022 based on time order of the frames. Alternatively, when there is only one secondary computing device 102, the main central processing unit 1011 may allocate upper half portion of a frame to the main graphics card 1012 and allocate lower half portion of the frame to the secondary graphics card 1022 based on positions of macroblocks in the frame.

When the number of the secondary computing devices 102 is greater than one, for example, there are two secondary computing devices 102, the main central processing unit 1011 may allocate the first frame to the main graphics card 1012, the second frame to a secondary graphics card 1022 of one secondary computing device 102, and the third frame to a secondary graphics card 1022 of the other secondary computing device 102 based on time order of the frames. Image processing can be more orderly by allocating the raw image data based on time order of frames or positions of macroblocks in a frame.

Figure 2:
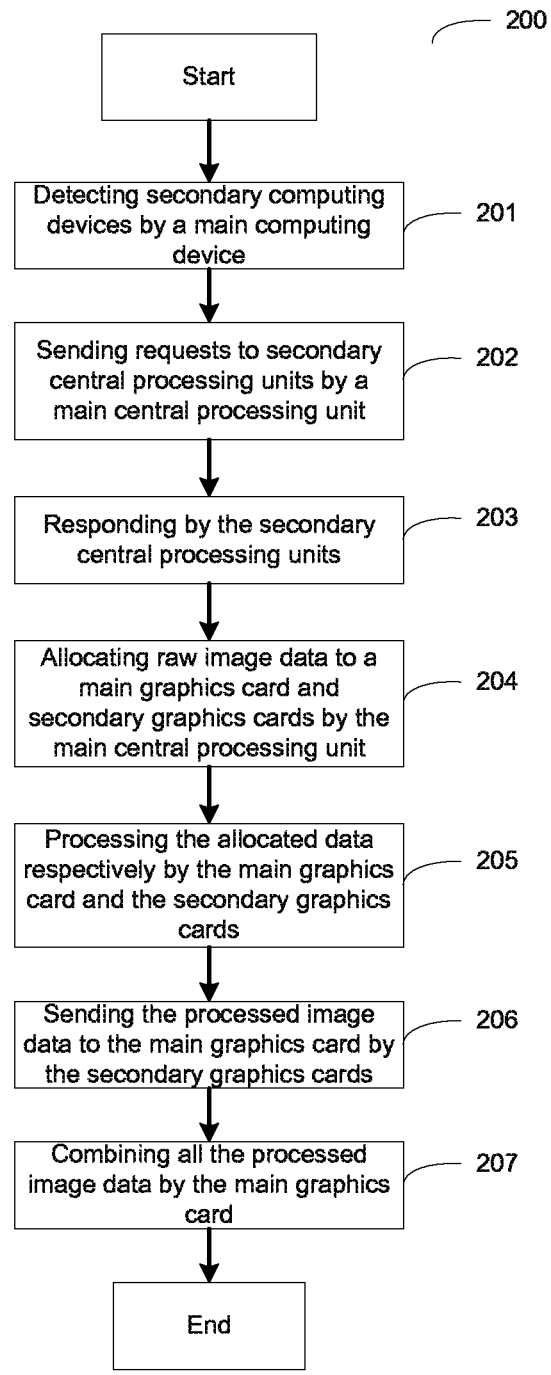
FIG. 2 illustrates a flow chart of an exemplary method for image processing according to a preferred embodiment of the present invention.

According to another embodiment of the present invention, a method for image processing is provided. FIG. 2 illustrates a flow chart of an exemplary method 200 for image processing according to a preferred embodiment of the present invention. As shown in FIG. 2, the method for image processing comprises the following steps.

At step 201, one or more secondary computing devices are detected by a main computing device, wherein the main computing device comprises a main graphics card and a main central processing unit, and each of the one or more secondary computing devices comprises a secondary graphics card and a secondary central processing unit.

At step 202, the main central processing unit sends respective requests to process raw image data together to respective secondary central processing units of the one or more secondary computing devices, after the main computing device detects the one or more secondary computing devices.

At step 203, the respective secondary central processing units of the one or more secondary computing devices respond to the main central processing unit based on the respective requests.

At step 204, respective responses are received from the respective secondary central processing units of the one or more secondary computing devices by the main central processing unit, and the raw image data is allocated to the main graphics card and respective secondary graphics cards of the one or more secondary computing devices by the main central processing unit.

At step 205, the allocated partial image data of the raw image data is processed by the main graphics card, and the allocated remaining image data of the raw image data is processed by the respective secondary graphics cards of the one or more secondary computing devices.

At step 206, the processed remaining image data is sent to the main graphics card by the respective secondary graphics cards of the one or more secondary computing devices.

At step 207, the processed remaining image data is received and the processed partial image data and the processed remaining image data is combined by the main graphics card.

According to a preferred embodiment of the present invention, after step 203 and before step 204, the method described above further comprises testing performance of the main graphics card and the respective secondary graphics cards of the one or more secondary computing devices by corresponding graphics card test modules, which are included in the main computing device and the one or more secondary computing devices respectively. And the method further comprises sending test results of the respective secondary graphics cards of the one or more secondary computing devices to the main central processing unit by the respective secondary central processing units of the one or more secondary computing devices. At step 204, the raw image data is allocated based on a test result of the main graphics card and the test results of the respective secondary graphics cards of the one or more secondary computing devices by the main central processing unit.

Optionally, when the number of the secondary computing devices is greater than n, namely when the main central processing unit receives more than n responses, the step of allocating the raw image data comprises allocating the remaining image data to first (n+1) secondary graphics cards with better performance, wherein n is a positive integer. Preferably, the performance of the graphics card tested by the graphics card test module is selected from a group including processor clock, memory size and memory bandwidth.

According to another preferred embodiment of the present invention, at step 204, the raw image data is proportionately allocated to the main graphics card and the respective secondary graphics cards of the one or more secondary computing devices by the main central processing unit. Preferably, the remaining image data is allocated to the secondary graphics cards corresponding to (n+1) secondary central processing units which respond to the main central processing unit earliest by the main central processing unit when the main central processing unit receives more than n responses, wherein n is a positive integer.

According to another preferred embodiment of the present invention, at step 204, the raw image data is allocated based on time order of frames of the raw image data or positions of macroblocks in a frame of the raw image data by the main central processing unit.

According to a preferred embodiment of the present invention, the main computing device and the one or more secondary computing devices communicate with each other by one or more wired connections. According to another preferred embodiment of the present invention, the main computing device and the one or more secondary computing devices communicate with each other wirelessly.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A system for image processing, comprising:
a first computing device; and
one or more second computing devices, wherein the first computing device comprises a first graphics card and a first processor and each of the one or more second computing devices comprises a second graphics card and a second processor, and
wherein the first computing device is configured to:
   detect the one or more second computing devices;
   send respective requests to process input image data to respective second processors of the one or more second computing devices;
   allocate the input image data to the first graphics card and respective second graphics cards of the one or more second computing devices after receiving respective responses from the respective second processors of the one or more second computing devices;
   process allocated partial image data of the input image data;
   receive processed remaining image data of the input image data at the first computing device from the respective second graphics cards of the one or more second computing devices, wherein the respective second graphics cards of the one or more second computing devices are operable to process allocated remaining image data; and
   combine the processed partial image data and the processed remaining image data.

2. The system according to claim 1, wherein
each of the first computing device and the one or more second computing devices further comprises a graphics card test module configured to test performance of a corresponding first graphics card or a corresponding second graphics card; and
wherein the first computing device is further configured to:
receive test results of the respective second graphics card of the one or more second computing devices sent from the respective second processors of the one or more second computing devices; and
allocate the input image data based on a test result of the first graphics card and the test results of the respective second graphics cards of the one or more second computing devices.

3. The system according to claim 2, wherein the first processor is further configured to allocate the remaining image data to a first (n+1) second graphics cards with better performance, wherein the first processor receives more than n responses, and wherein n is a positive integer.

4. The system according to claim 2, wherein a performance test tests for metrics selected from a group consisting of: processor clock, memory size and memory bandwidth.

5. The system according to claim 1, wherein the first processor is further configured to proportionately allocate the input image data to the first graphics card and the respective second graphics cards of the one or more second computing devices.

6. The system according to claim 5, wherein the first processor is further configured to allocate the remaining image data to the second graphics cards corresponding to (n+1) second processors which respond to the first processor earliest when receiving more than n responses, and wherein n is a positive integer.

7. The system according to claim 1, wherein the first processor is further configured to allocate the input image data based on time order of frames of the input image data or positions of macroblocks in a frame of the input image data.

8. The system according to claim 1, wherein the first computing device and the one or more second computing devices communicate with each other via one or more connecting lines.

9. The system according to claim 1, wherein the first computing device and the one or more second computing devices further comprise respective wireless network cards and are configured to wirelessly communicate with each other via the respective wireless network cards.

10. The system according to claim 1, wherein the first computing device and the one or more second computing devices further comprise respective Bluetooth modules and are configured to communicate with each other via the respective Bluetooth modules.

11. The system according to claim 1, wherein the first graphics card and the respective second graphics cards of the one or more second computing devices are discrete graphics cards.

12. A method for image processing, said method comprising:
identifying one or more secondary computing devices by a main computing device, wherein the main computing device comprises a main graphics card and a main processor, and each of the one or more secondary computing devices comprises a second graphics card and a second processor;
sending respective requests to process input image data to respective second processors of the one or more second computing devices from the main processor;
allocating the input image data to the main graphics card and respective second graphics cards of the one or more second computing devices by the main processor;
processing allocated partial image data of the input image data by the main graphics card;
processing allocated remaining image data of the input image data by the respective second graphics cards of the one or more second computing devices;
receiving the processed remaining image data at the main graphics card from the respective second graphics cards of the one or more second computing devices; and
combining the processed partial image data and the processed remaining image data.

13. The method according to claim 12, further comprising:
testing performance of the main graphics card and the respective second graphics cards of the one or more second computing devices by corresponding graphics card test modules, wherein said graphics card test modules are included in the main computing device and the one or more second computing devices; and
receiving test results of the respective second graphics cards of the one or more second computing devices at the main processor from the respective second processors of the one or more second computing devices,
wherein the allocating the input image data comprises:
allocating the input image data based on a test result of the main graphics card and the test results of the respective second graphics cards of the one or more second computing devices by the main processor.

14. The method according to claim 13, wherein the allocating the input image data comprises allocating the remaining image data to first (n+1) second graphics cards with better performance, wherein the main processor receives more than n responses, and wherein n is a positive integer.

15. The method according to claim 13, wherein the performance test tests for metrics selected from a group consisting of: processor clock, memory size and memory bandwidth.

16. The method according to claim 12, wherein the allocating the input image data comprises proportionately allocating the input image data to the main graphics card and the respective second graphics cards of the one or more secondary computing devices.

17. The method according to claim 16, wherein the allocating the input image data comprises allocating the remaining image data to the second graphics cards corresponding to (n+1) second processors which respond to the main processor earliest when the main processor receives more than n responses, and wherein n is a positive integer.

18. The method according to claim 12, wherein the allocating the input image data is based on time order of frames of the input image data or positions of macroblocks in a frame of the input image data.

19. The method according to claim 12, wherein the main computing device and the one or more second computing devices communicate with each other by one or more wired connections.

20. The method according to claim 12, wherein the main computing device and the one or more second computing devices communicate with each other wirelessly.

* * * * *